(12) United States Patent
Ngo et al.

(10) Patent No.: US 12,405,167 B2
(45) Date of Patent: Sep. 2, 2025

(54) ACTIVE INFRARED THERMOGRAPHY SYSTEM AND COMPUTER-IMPLEMENTED METHOD FOR GENERATING THERMAL IMAGE

(71) Applicant: Agency for Science, Technology and Research, Singapore (SG)

(72) Inventors: Chun Yong Andrew Ngo, Singapore (SG); Vinod Kumar S/O Sivaraja, Singapore (SG); Wenjiang Guo, Singapore (SG)

(73) Assignee: AGENCY FOR SCIENCE, TECHNOLOGY AND RESEARCH, Singapore (SG)

( * ) Notice: Subject to any disclaimer, the term of this patent is extended or adjusted under 35 U.S.C. 154(b) by 637 days.

(21) Appl. No.: 17/797,787

(22) PCT Filed: Feb. 2, 2021

(86) PCT No.: PCT/SG2021/050050
§ 371 (c)(1),
(2) Date: Aug. 5, 2022

(87) PCT Pub. No.: WO2021/158174
PCT Pub. Date: Aug. 12, 2021

(65) Prior Publication Data
US 2023/0046023 A1 Feb. 16, 2023

(30) Foreign Application Priority Data
Feb. 7, 2020 (SG) ............................ 10202001122U

(51) Int. Cl.
*G01J 5/48* (2022.01)
*G01J 5/00* (2022.01)
(Continued)

(52) U.S. Cl.
CPC ................ *G01J 5/48* (2013.01); *G01J 5/025* (2013.01); *G01J 5/0896* (2013.01); *G01N 25/72* (2013.01); *G01J 2005/0077* (2013.01)

(58) Field of Classification Search
CPC ........................................................ G01J 5/48
See application file for complete search history.

(56) References Cited

U.S. PATENT DOCUMENTS 5,118,945 A 6/1992 Winschuh et al.
5,386,117 A 1/1995 Piety et al.
(Continued)

FOREIGN PATENT DOCUMENTS

CN 105866168 A 8/2016
CN 106770437 A 5/2017
(Continued)

OTHER PUBLICATIONS

International Search Report in international application No. PCT/SG2021/050050, mailed Apr. 22, 2021.
(Continued)

*Primary Examiner* — Carolyn Fin
(74) *Attorney, Agent, or Firm* — NIXON PEABODY LLP

(57) ABSTRACT

An active infrared thermography system and a computer-implemented method for generating a thermal image are provided. The active infrared thermography system includes one or more excitation sources, an infrared camera, one or more portable power sources arranged to power the one or more excitation sources and the infrared camera, and a
(Continued)

housing, the one or more excitation sources and the one or more portable power sources being received in the housing.

28 Claims, 17 Drawing Sheets

(51) Int. Cl.
    *G01J 5/02*     (2022.01)
    *G01J 5/08*     (2022.01)
    *G01N 25/72*     (2006.01)

(56) References Cited

U.S. PATENT DOCUMENTS

| | | |
|---|---|---|
| 5,637,871 A | 6/1997 | Piety et al. |
| 9,250,134 B2 | 2/2016 | Shepard et al. |
| 2010/0231722 A1 | 9/2010 | Hill, Jr. et al. |
| 2011/0169961 A1 | 7/2011 | Wu |
| 2012/0119112 A1 | 5/2012 | Houde-Walter et al. |
| 2021/0150745 A1* | 5/2021 | Yang .................. G06T 7/11 |

FOREIGN PATENT DOCUMENTS

| | | |
|---|---|---|
| CN | 206804162 U | 12/2017 |
| CN | 109765267 A | 5/2019 |
| CN | 110322429 A | 10/2019 |
| DE | 102013017049 A1 | 4/2015 |
| WO | 2015084909 A1 | 6/2015 |

OTHER PUBLICATIONS

Written Opinion in international application No. PCT/SG2021/050050, mailed Apr. 22, 2021.

Genest, M., et al. "Comparison of thermography techniques for inspection of F/A-18 honeycomb structures", Aircraft Aging 2007 Conference; 2007, 14 pp.

Swiderski, W. "Nondestructive testing of honeycomb type composites by an infrared thermography method", Proc. IV Conferencia Panamericana de END, Buenos Aires; Oct. 2007, 12 pp., Buenos Aires.

A318/A319/A320/A321, Nondestructive Testing Manual (NTM); Issue May 1, 1988, revised Aug. 1, 2011; 144 pp, Airbus S.A.S.; France.

A318/A319/A320/A321, Nondestructive Testing Manual (NTM) for Elevator Inspection, 2007, 32 pp, Airbus; Germany.

Workswell Research & Development Series Active ThermoInspector Active Thermography System, 10 pp. https://workswell-thermal-camera.com/workswell-active-thermoinspector/ retrieved Aug. 17, 2022.

Opgal NDTherm NT/LF, 10 pp. https://www.opgal.com/ retrieved Aug. 17, 2022.

C-CheckIR, The Mobile Solution for Non-Destructive Testing with Active Thermography, 4 pp. https://automationtechnology.de/cms/wp-content/uploads/2015/07/C-CheckIR_web2.pdf retrieved Aug. 17, 2022.

MoviTHERM advance thermography solutions; iRNDT C-CheckIR Mobile irNDT Inspection Solution; 2 pp. https://movitherm.com/solutions/non-destructive-testing/c-checkir/ Originally accessed date: Jul. 25, 2019. Retrieved Aug. 19, 2022.

Ether NDE; MoviTHERM Introduces a Portable NDT System for Composite Materials Inspection; e-Journal of Nondestructive Testing (NDT), Jun. 2013; 5 pp. https://www.ndt.net/search/docs.php3?id=14453&content=1 Originally accessed date: Jul. 25, 2019. Retrieved Aug. 19, 2022.

Introduction to C-CheckIR, Mobile Non-Destructive Testing solution, 1 p. https://www.youtube.com/watch?v=pX8T-knwRKY Originally accessed date: Jul. 25, 2019. Retrieved Aug. 19, 2022.

RTUTec Detecting Technologies, Active Thermography systems for Composite materials inspections; 2 pp. https://www.rtutec.com/ndtherm Originally accessed date: Jul. 26, 2019. Retrieved Aug. 19, 2022.

Portable, Low-Cost Thermographic NDT System https://www.ndt.net/search/docs.php3?id=10352&content=1 Originally accessed date: Jul. 31, 2019. Retrieved Aug. 19, 2022.

Thermal Wave Imaging; The Leaders And Innovators In Thermography for NDT, 14 pp. https://www.thermalwave.com/ Originally accessed date: Jul. 31, 2019. Retrieved Aug. 19, 2022.

* cited by examiner

| | "Best" frame chosen by experienced thermographer | Reconstructed image from Embodiments of Present Invention |
|---|---|---|
| (1) |  |  |
| (2) |  |  |
| (3) |  |  |

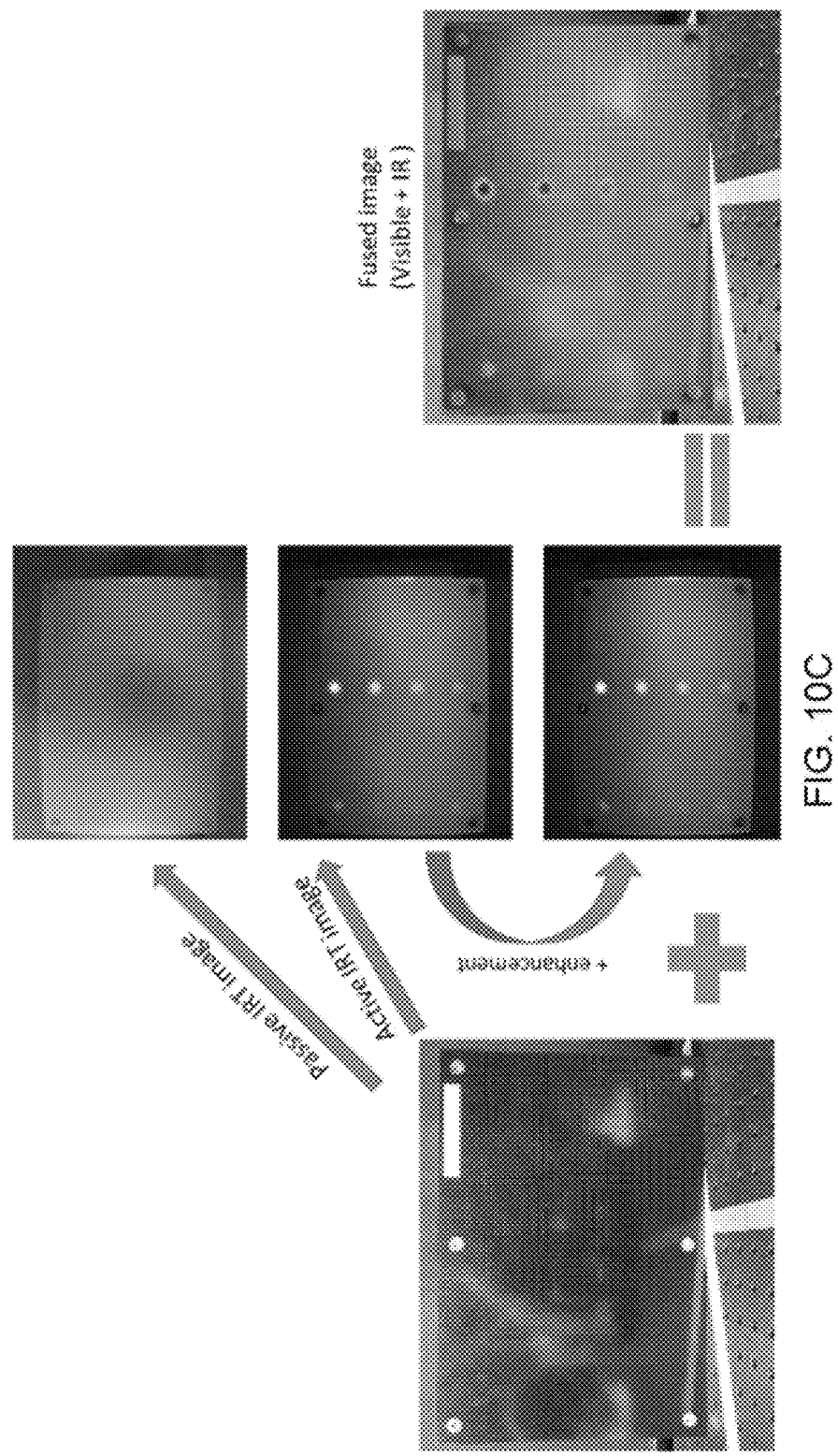

ACTIVE INFRARED THERMOGRAPHY SYSTEM AND COMPUTER-IMPLEMENTED METHOD FOR GENERATING THERMAL IMAGE

CROSS-REFERENCE TO RELATED APPLICATIONS

This application is the United States National stage of International application PCT/SG2021/050050, filed Feb. 2, 2021, which in turn, claims priority of Singapore Application No. 10202001122U, filed Feb. 7, 2020, the entire disclosures of both of which are herein incorporated by reference.

FIELD OF THE INVENTION

The present invention relates in general to active thermography and more particularly to an active infrared thermography system and a computer-implemented method for generating a thermal image.

BACKGROUND OF THE INVENTION

Active thermography is useful for inspection and defect detection. However, use of existing active thermography systems for inspection and defect detection is both cumbersome and inefficient. It would therefore be desirable to provide an active infrared thermography system and a computer-implemented method for generating a thermal image that render inspection and defect detection more convenient and efficient.

SUMMARY OF THE INVENTION

Accordingly, in a first aspect, the present invention provides an active infrared thermography system. The active infrared thermography system includes one or more excitation sources, an infrared camera, one or more portable power sources arranged to power the one or more excitation sources and the infrared camera, and a housing. The one or more excitation sources and the one or more portable power sources are received in the housing.

In a second aspect, the present invention provides a computer-implemented method for generating a thermal image. The method includes executing on one or more processors the steps of: acquiring thermal image data on a subject; activating one or more excitation sources to radiate the subject; ending acquisition of the thermal image data on the subject when a cooling pattern is captured; determining a cooling curve of each pixel of the thermal image data; calculating a cooling coefficient of each pixel of the thermal image data; and scaling the cooling coefficient of each pixel of the thermal image data to a colour palette to produce a heat map.

Other aspects and advantages of the invention will become apparent from the following detailed description, taken in conjunction with the accompanying drawings, illustrating by way of example the principles of the invention.

BRIEF DESCRIPTION OF THE DRAWINGS

Embodiments of the invention will now be described, by way of example only, with reference to the accompanying drawings, in which:

FIGS. 10A through 10E are comparative examples of passive infrared thermography results and active infrared thermography results on different defects and composite materials.

DETAILED DESCRIPTION OF EXEMPLARY EMBODIMENTS

Figure 1:
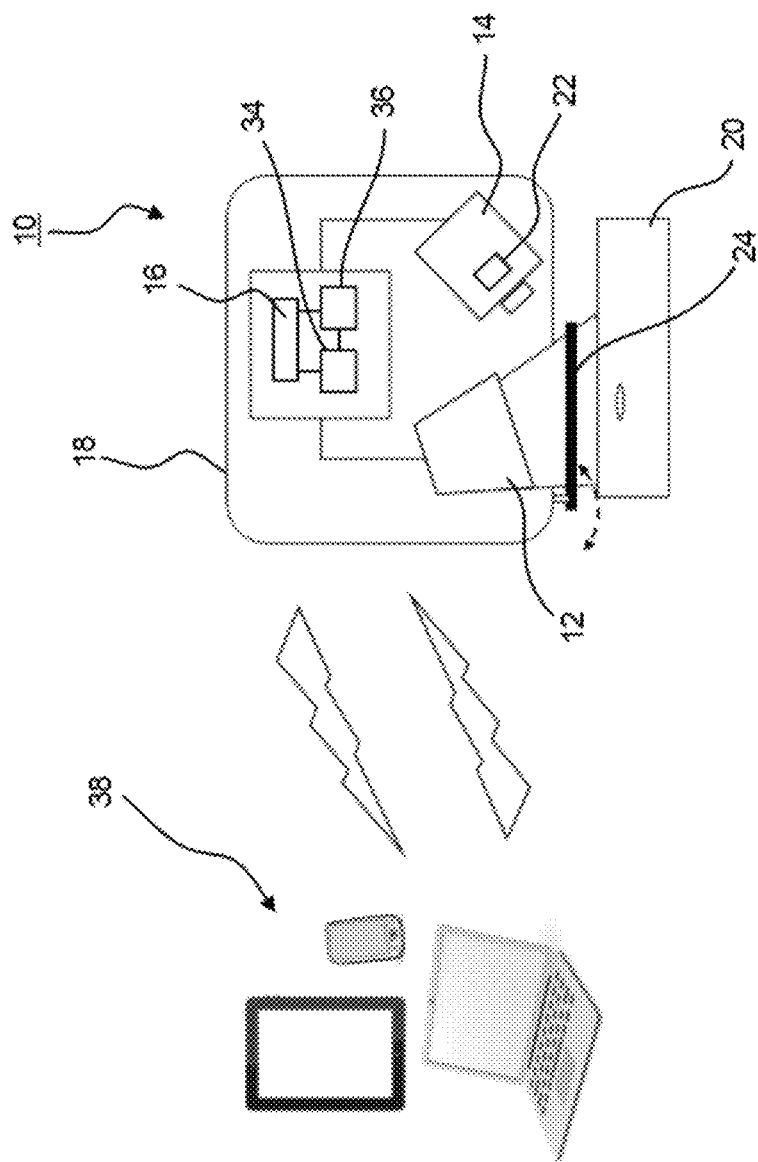
FIG. 1 is a schematic diagram illustrating an active infrared thermography (IRT) system in accordance with an embodiment of the present invention.

The detailed description set forth below in connection with the appended drawings is intended as a description of presently preferred embodiments of the invention, and is not intended to represent the only forms in which the present invention may be practiced. It is to be understood that the same or equivalent functions may be accomplished by different embodiments that are intended to be encompassed within the scope of the invention.

The term "active infrared thermography" as used herein refers to intentional application of heat that results in a temperature rise in a region of interest (ROI). A thermal abnormality that appears on the ROI can then be observed when viewed with an infrared camera. Due to the additional energy that is channelled onto the ROI, the thermal contrast between the defects and its surrounding becomes larger and consequently the probability of detection (POD) is higher than that of conventional thermography. In active infrared thermography, an external stimulus is required for thermal excitation.

The term "excitation source" as used herein refers to a source of excitation energy for radiative heating. Examples of such radiative sources include, but are not limited to, infrared (IR) lamps and white or coloured light-emitting diode (LED) lamps.

The term "infrared camera" as used herein refers to a non-contact device that detects infrared energy (heat) and converts it into a visual image.

The term "portable power source" as used herein refers to a device capable of supplying electrical energy that can be easily moved around such as, for example, a ChargeTech 54K dual alternating current (AC) battery pack.

The term "radiative power" as used herein is a measure of the rate at which energy is emitted via thermal radiation by a source.

The term "visible camera" as used herein refers to a device that create images that replicate human vision.

The term "about" as used herein refers to both numbers in a range of numerals and is also used to indicate that a value includes the standard deviation of error for the device or method being employed to determine the value. The term "about" as used herein can allow for a degree of variability in a value or range, for example, within 10%, within 5%, or within 1% of a stated value or of a stated limit of a range.

The term "thermal image data" as used herein refers to information on heat distribution in a subject.

The term "cooling pattern" as used herein refers to information on changes in the heat distribution in the subject as the subject cools to room temperature.

The term "cooling curve" as used herein refers to a plot of temperature changes over time at a particular spot in the subject.

The term "cooling coefficient" as used herein refers to a plot of temperature changes over time at a particular spot in the subject.

The term "colour palette" as used herein refers to a range of colours.

The term "heat map" as used herein refers to a graphical representation of data where individual values contained in a matrix are represented as colors.

The term "background subtraction" as used herein refers to removing background data from data to be processed.

The term "temporal temperature profile" as used herein refers to a temperature at a particular spot in the subject at a particular point in time.

The term "Newton's cooling model" as used herein refers to the thermal response of an object that was previously heated by an external source and cooled by the surrounding medium such as, for example, air.

The term "Gaussian sharpening filter" as used herein refers to an image processing technique that allows high frequency image information to pass through and blocks low frequency image information.

The term "convolution filter" as used herein refers to an image processing technique that blurs, sharpens, enhances or smooths an image depending on choice of the kernel used to scan across the image.

The term "visual image" as used herein refers to an image that replicates human vision.

The term "feature points" as used herein refers to common features that can be recognized in both infrared and visual images.

The term "transformation matrix" as used herein refers to a two-dimensional matrix that is used to map points in one coordinate system to another coordinate system.

The term "least square optimisation" as used herein refers to a regression analysis method used to approximate a solution of a set of equations by minimizing the sum of the squares of the residuals made in the results of every single equation.

The term "corrected heat map" as used herein refers to a graphical representation of data where individual values contained in a matrix are represented as colors, the individual values contained in the matrix having been corrected for inaccuracies.

Referring now to FIG. 1, an active infrared thermography (IRT) system 10 is shown. The active IRT system 10 includes one or more excitation sources 12, an infrared camera 14, one or more portable power sources 16 arranged to power the one or more excitation sources 12 and the infrared camera 14, and a housing 18. The one or more excitation sources 12 and the one or more portable power sources 16 are received in the housing 18.

The active IRT system 10 is a system by itself in that it does not require electrical cables for external connection to a wall plug. The active IRT system 10 may have a mass of between about 0.5 kilogram (kg) and about 5 kg, more preferably, between about 1 kg and about 2 kg. Advantageously, being relatively light-weight, the active IRT system 10 may be carried around, for example, by hand or in a backpack. Further advantageously, the active IRT system 10 is flexible enough to be mounted on various platforms such as, for example, a tripod with or without wheels, robotic arms, drones, etc.

Each of the one or more excitation sources 12 may have a radiative power of less than 500 watts (W), more preferably, between about 100 W and 450 W. Contrary to established belief, it has now been discovered that low power excitation sources may effectively be used for defect excitation. Use of low power (<500 W) radiative sources such as, for example, infrared (IR) and light-emitting diode (LED) lamps, had been overlooked since the radiative power of such sources is much lower and had not therefore been expected to heat up a surface noticeably for IRT inspection. The one or more radiative or excitation sources 12 may therefore be infrared (IR) lamps, white or coloured light-emitting diode (LED) lamps, any low power radiative sources or combinations thereof.

Given that the excitation power is lower, there is a limit to how deep the heat can penetrate. The active IRT system 10 may be used to detect sub-surface defects of up to 6 millimetres (mm) in depth. Although a higher optical power generally penetrates deeper, increasing optical power is not the only way to increase penetration depth and penetration depth may be adjusted by varying wavelength, excitation or heating duration and/or distance from a sample or subject 20. Penetration depth may be increased by using a radiative source whose wavelength resonates with absorption properties of a material so that there is effective coupling of energy to the material and/or using focused lens design so that a radiated beam is more focused, instead of dispersive. The heating duration may be, for example, 10 seconds(s), 15 s, 30 s, 60 s or 90 s.

Apart from using radiative source(s) with higher power, optical power may also be increased by increasing the number of light or excitation sources 12 employed. Each of the one or more excitation sources 12 may have a mass of less than 400 grams (g), more preferably between about 200 g and about 400 g. Advantageously, when the light or excitation sources 12 used are less than 400 g, the active IRT system 10 is relatively lightweight.

Examples of suitable excitation sources 12 are shown in Table 1 below.

TABLE 1

| Excitation or Radiative Light Source | IR Lamp | LED Lamp | LED Head Lamp (Coloured) |
|---|---|---|---|
| Power Consumption (W) | 150 | 100 | <100 |
| Weight (kg) | 0.4 | 0.2 | 0.2 |
| Dimensions (mm) | 230 × 130 × 190 | 120 × 120 × 200 | 80 × 100 × 100 |

The infrared camera 14 may be a mid-wave infrared camera or a long-wave infrared camera and may be positioned at a distance of, for example, 20 centimetres (cm), 30 cm, 40 cm, 60 cm or 80 cm from the sample or subject 20. Depending on application requirements, the infrared camera 14 may have different specifications such as, for example, pixel resolution, thermal resolution, frame rate and interchangeable lens. Examples of suitable infrared cameras 14 are shown in Table 2 below.

TABLE 2

| IR Camera Model | FLIR One Pro | Seek Thermal Compact Pro | Opgal Therm-App Pro |
|---|---|---|---|
| Pixel Resolution (pixels) | 160 × 120 | 320 × 240 | 640 × 480 |
| Thermal Resolution (mK) | 150 | 70 | 30 |
| Lens (degree) | 55 × 43 | 32 × 32 | 55 × 41 (6.8 mm) 29 × 22 (13 mm) 19 × 14 (19 mm) 11 × 8 (35 mm) |
| Frame Rate (Hz) | 9 | 15 | 25 |

The active IRT system 10 may also include a visible camera 22 powered by the one or more portable power sources 16 and received in the housing 18. Depending on application requirements, the visible camera 22 may also have different specifications such as, for example, pixel resolution, aperture and shutter speed.

The one or more portable power sources 16 may include a ChargeTech 54K Dual alternating current (AC) battery pack.

The active IRT system 10 may further include one or more shutters 24 arranged to at least partially block off the one or more excitation sources 12.

Referring now to FIGS. 2A through 2F, various embodiments of the one or more shutters 24 of the active IRT system 10 are shown. The one or more shutters 24 may be operated by a push button 26 provided on a handle 28.

In the embodiments shown in FIGS. 2A through 2D, the shutters 24 may be attached to the housing 18 by hinges 30. The push button 26 may be used to control open and close positions of the shutters 24 via the hinges 30 and a spring-loaded mechanism. As can be seen from the embodiments shown in FIGS. 2A through 2D, several configurations are possible with all components within the housing or jig 18 or some components outside of the housing or jig 18. The shutters 24 may be located on the top or side of the housing or jig 18.

Figure 2A:
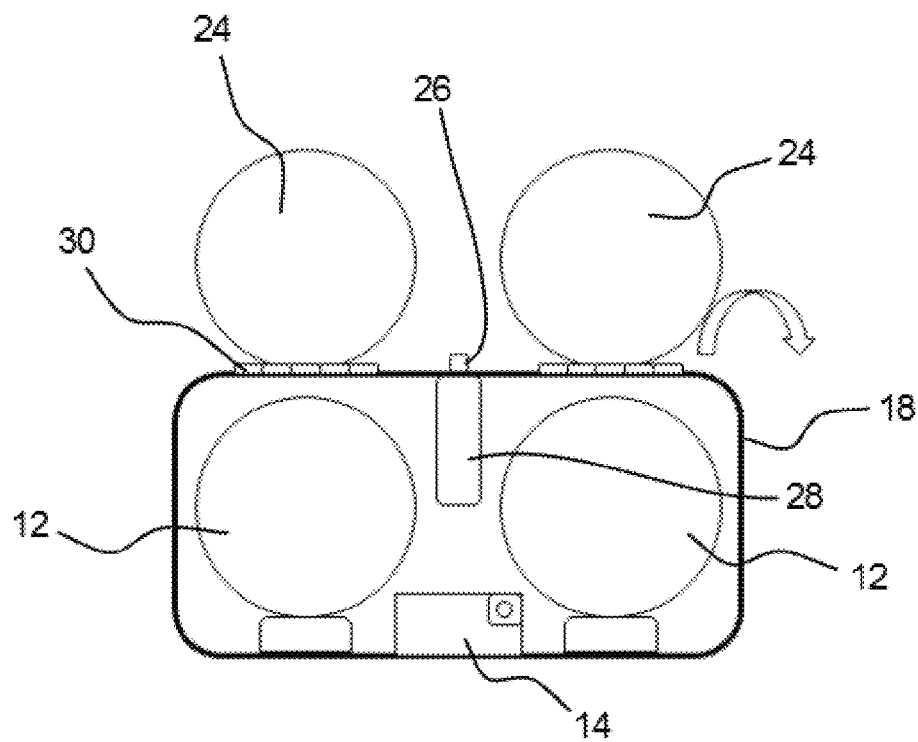
FIGS. 2A through 2F are schematic diagrams illustrating various embodiments of one or more shutters of the active IRT system of FIG. 1.
Figure 2B:
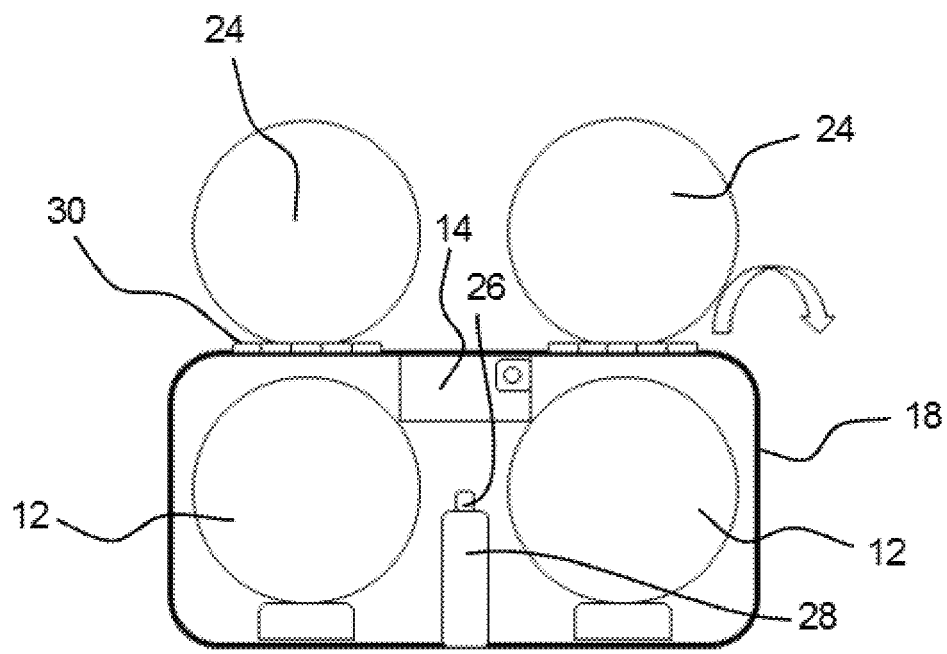
Figure 2C:
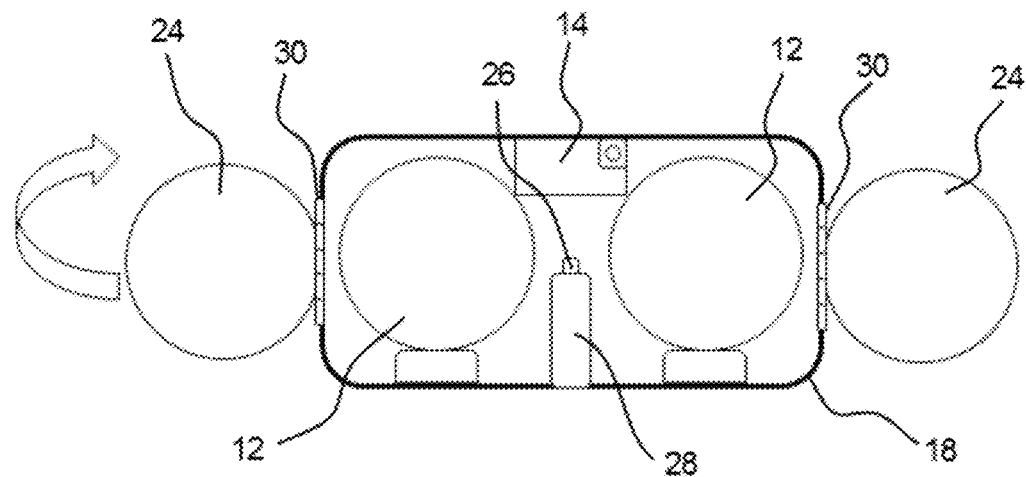
Figure 2D:
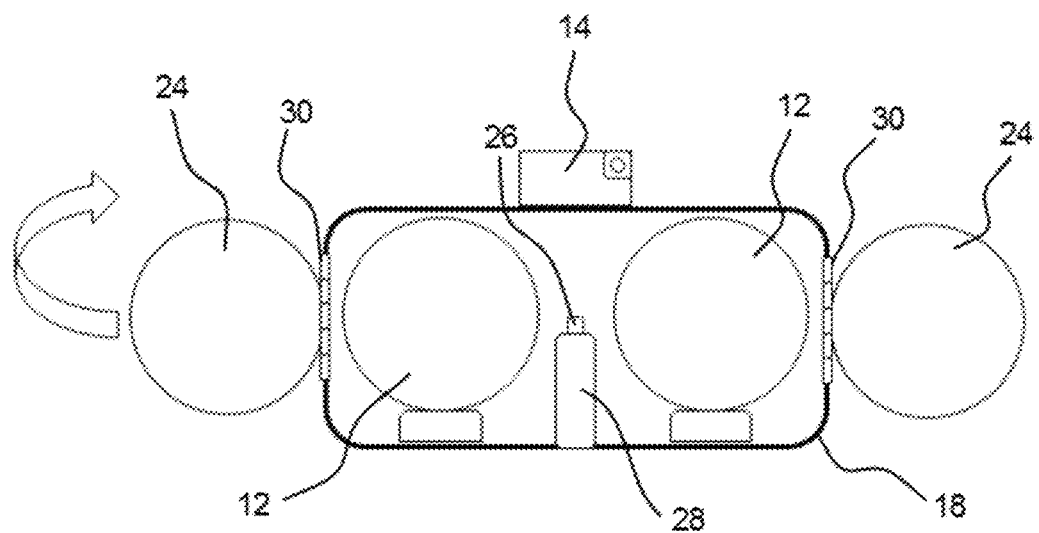
Figure 2E:
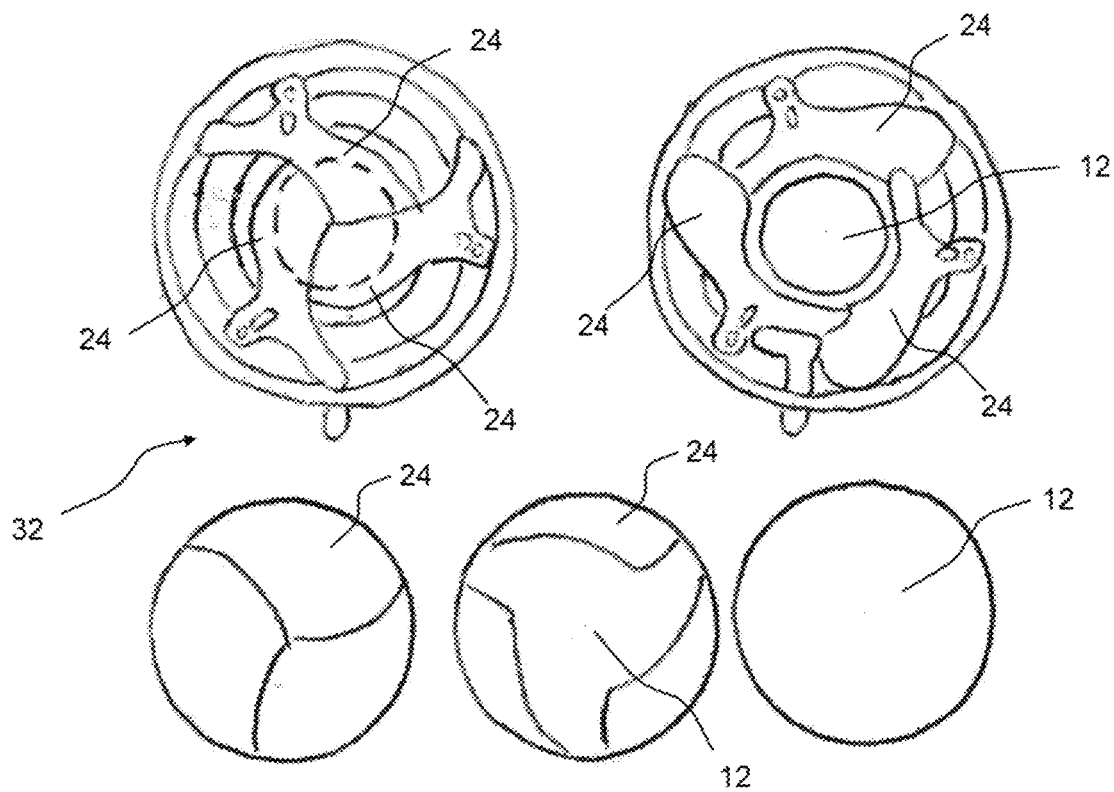
Figure 2F:
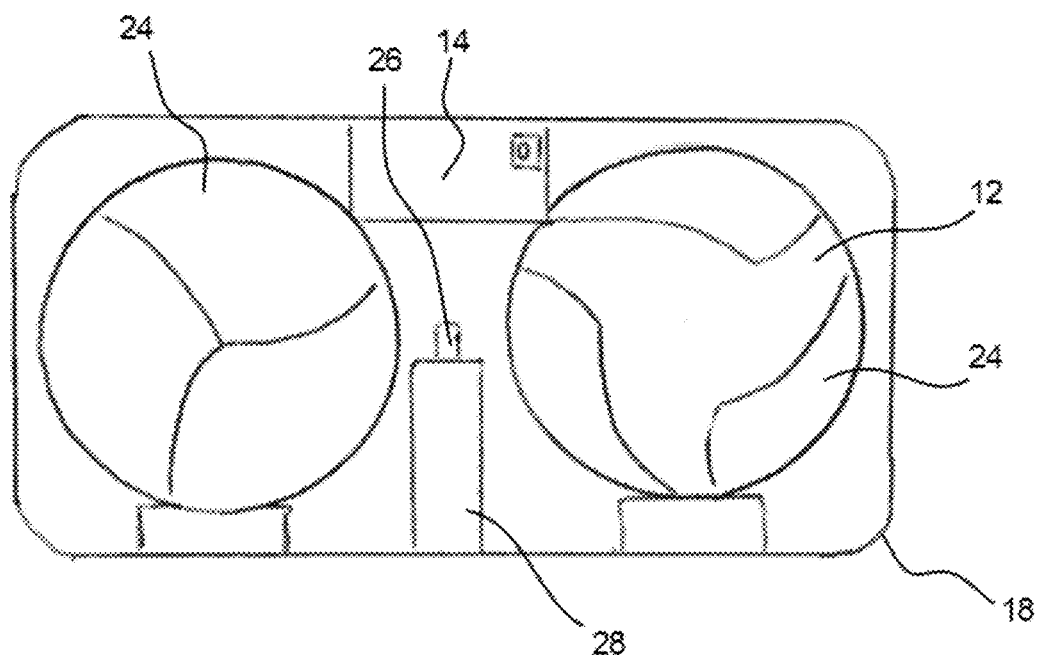

In the embodiments shown in FIGS. 2E and 2F, a leaf-shutter mechanism 32 may be employed to open and close the shutters 24, the shutters 24 being attached to a front portion of the excitation sources 12. Advantageously, the leaf-shutter mechanism provides a sleek design with the push button 26 being used to control opening and closing of the shutters 24.

Referring again to FIG. 1, the active IRT system 10 may further include a non-transitory computer-readable memory 34 storing computer program instructions executable by one or more computer processors 36 to perform operations for generating a thermal image. The operations performed by the one or more computer processors 36 for generating a thermal image will be described in greater detail below with reference to FIGS. 3 through 10E. The non-transitory computer-readable memory 34 and the one or more computer processors 36 may be electrically connected to the one or more portable power sources 16 via electronic circuitry. The active IRT system 10 may include one or more algorithms to reconstruct a result of active transient thermography based on Newton's cooling law, acquire a thermal video to be used, automatically implement acquisition of the thermal video, and/or to form a fusion image from a visual image and a thermal image.

The active IRT system 10 may be remotely controlled and/or monitored via a mobile device 38 such as, for example, a handphone, a tablet, a laptop, etc. Advantageously, this facilitates performance of active IRT inspection without physically touching the active IRT system 10.

Although exemplary values have been provided, it should be appreciated by those of ordinary skill in the art that wavelength, optical power and optical duration of the one or more excitation sources 12 and detector wavelength, thermal resolution, spatial resolution and frame rate of the thermal sensor/camera 14 are variable when determining a solution for defect inspection and detection depending on the texture and material of the sample of interest 20.

Having described various elements of the active IRT system 10, a method of operating the active IRT system 10 will now be described below with reference to FIG. 3.

Figure 3:
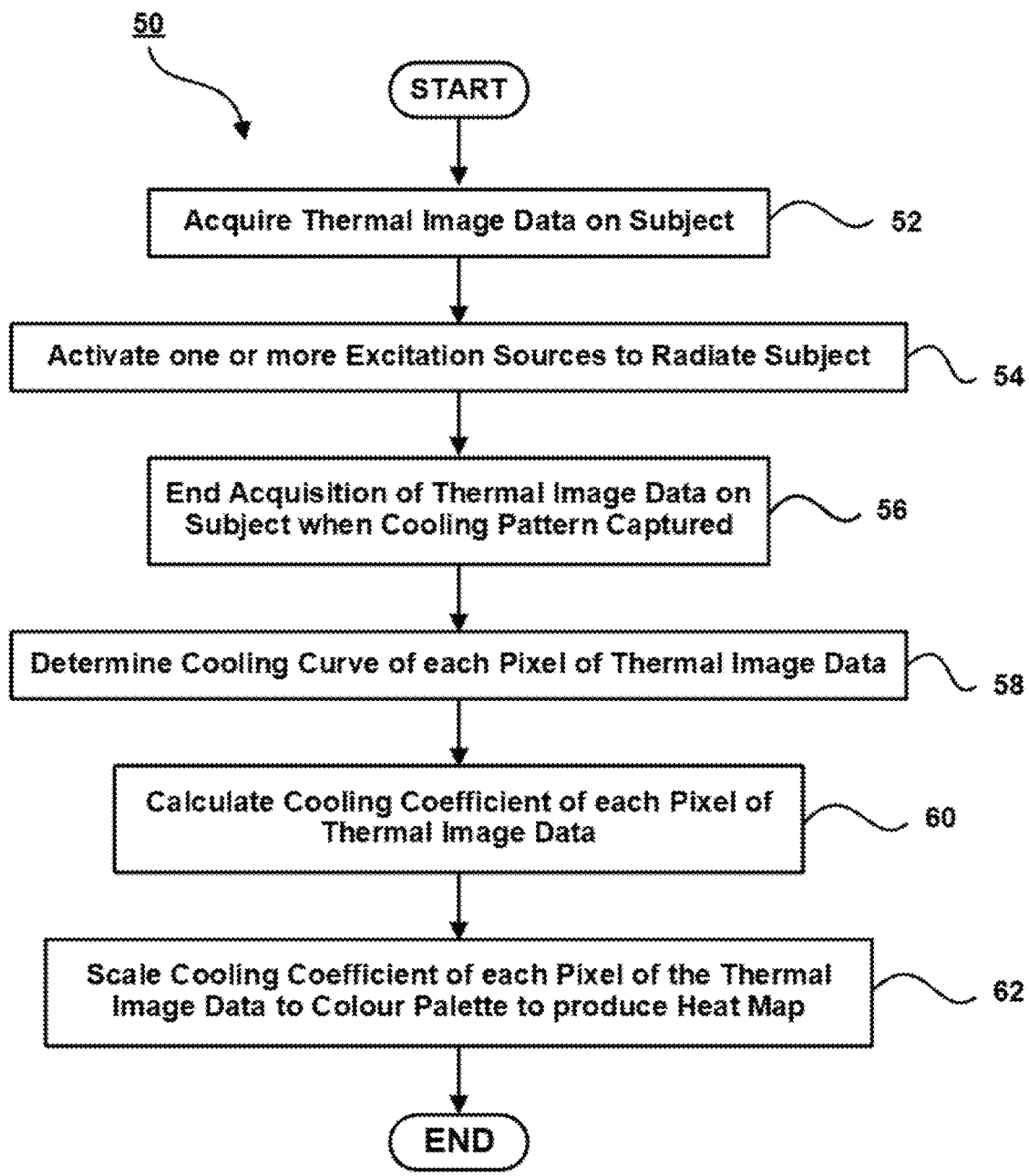
FIG. 3 is a schematic flow diagram illustrating a computer-implemented method for generating a thermal image in accordance with an embodiment of the present invention.

Referring now to FIG. 3, a computer-implemented method 50 for generating a thermal image is shown. The method 50 executed on the one or more processors 36 begins at step 52 by acquiring thermal image data on the subject 20. The thermal image data may be acquired in video form. The thermal image data in the video form may be converted into a three-dimensional (3D) array. More particularly, with the raw data collected or imported being a thermal video, the thermal video may be converted to a 3D array $T[x,y,t]$, where the x and y axis corresponds to the imaging plane, and the z axis is the time domain. The temperature at time $t_i$ at location $x_i$ and $y_i$ is represented by $T[x_i,y_i,t_i]$.

At step 54, one or more excitation sources 12 are activated to radiate the subject 20. The one or more excitation sources 12 may be activated after a predetermined delay. This helps ensure that background temperature is also recorded. In one or more exemplary embodiments, the one or more excitation sources 12 may be switched on with 1 to 2 seconds(s) delay after thermal video acquisition is initiated. Background subtraction may be performed using the thermal image data acquired during the predetermined delay. Advantageously, this is useful for image enhancement.

At step 56, acquisition of the thermal image data on the subject 20 is ended when a cooling pattern is captured. Accordingly, video recording continues until the cooling pattern is successfully captured. Duration of recording time may depend on excitation duration and the nature of the sample 20 to be inspected. For example, in the case of a carbon fibre specimen or sample of around 10 mm thick that has been heated up for 5 seconds, video recording may continue for 10 seconds after the one or more excitation sources 12 are switched off. Data acquisition may thus be customized and designed, following which data extraction is performed.

At step 58, a cooling curve of each pixel of the thermal image data is determined. This may involve extracting a temporal temperature profile of each pixel of the thermal image data. At the imaging plane, the temporal temperature profile of each pixel may be extracted as $T[x,y]$. This temporal temperature profile consists of a static process, a heating up process and a cooling down process. The step 58 of determining the cooling curve of each pixel of the thermal image data may further include offsetting a starting time of the temporal temperature profile of each pixel of the thermal image data to a start of a cooling down process. The cooling curve is further extracted by offsetting the starting time to the start of the cooling down process.

At step 60, a cooling coefficient of each pixel of the thermal image data is calculated. This may involve fitting the cooling curve of each pixel of the thermal image data to Newton's cooling model. According to Newton's Law of Cooling, a cooling coefficient is affected by the material that is being heated up. As such, hidden abnormalities may be detected by investigating the cooling rate on a sample surface.

Figure 4:
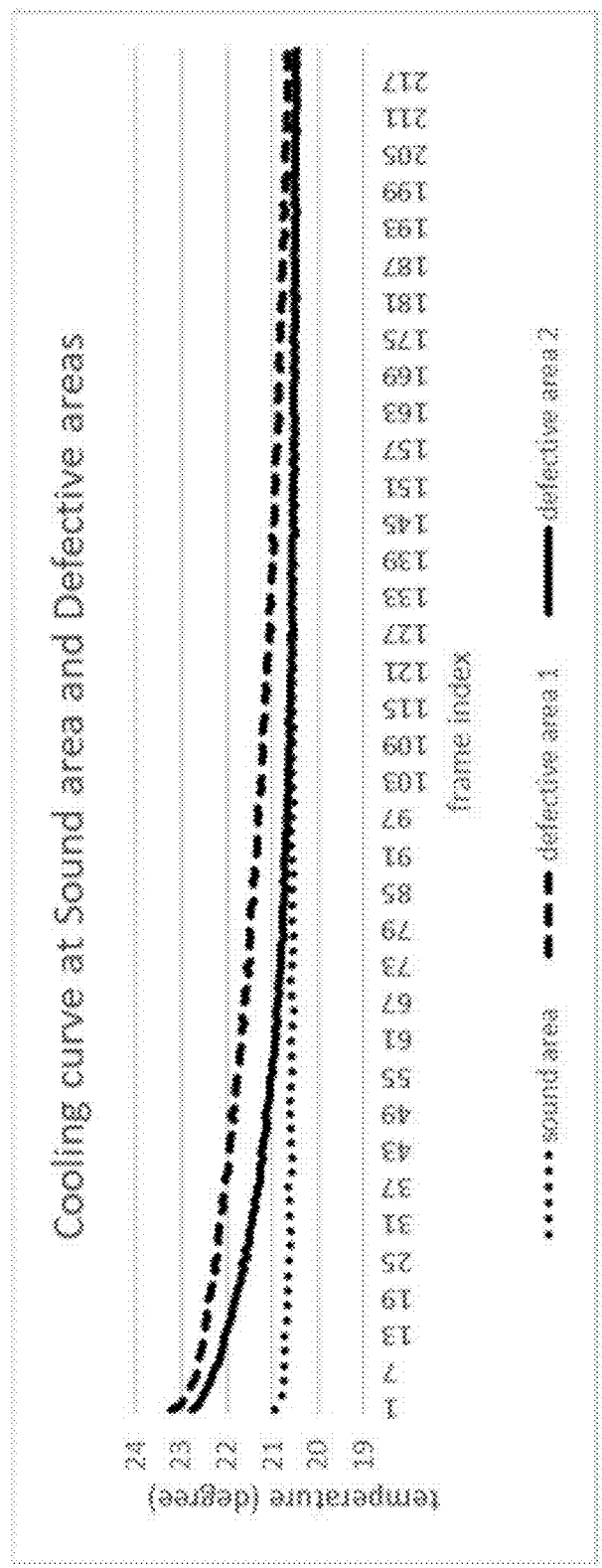
FIG. 4 is a graph of cooling curves from a sample with various subsurface defects.
Figure 5:
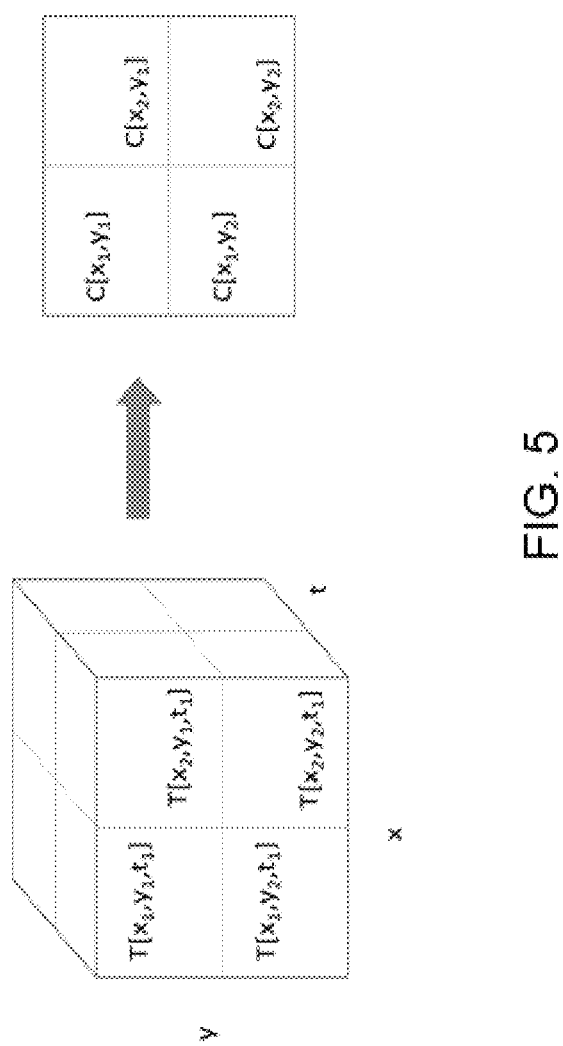
FIG. 5 is a schematic diagram illustrating conversion of video data into a 2D image.

Referring now to FIG. 4, shows cooling curves from a sample with various subsurface defects. More particularly, cooling curves at a sound area and defective areas of the sample are shown in FIG. 4. The cooling curve of each pixel is fitted to Newton's cooling model and the cooling coefficient is calculated accordingly as $C[x_i, y_i]$. By fitting each cooling curve to an exponential equation, the cooling rate of each pixel may be obtained. Instead of using temperature, the cooling coefficient may be used to represent the value at each pixel. In the present embodiment, the cooling coefficient calculated from the sound area is −0.068, while the cooling coefficients calculated from two (2) areas just above subsurface defects in the sample are −0.615 and −0.531, respectively. A 3D array may thus be downsized into a 2D array as shown in FIG. 5.

At step 62, the cooling coefficient of each pixel of the thermal image data is scaled to a colour palette to produce a heat map. More particularly, the 2D array of the cooling rate formed is converted into a heat map by linear scaling to a colour palette, the heat map representing a final result. At least one of a Gaussian sharpening filter and a convolution filter may be applied to the heat map. The Gaussian sharpening filter allows high frequency image information to pass through and blocks low frequency image information. Advantageously, this helps to effectively sharpen the image. The convolution filter acts to blur, sharpen, enhance or smooth the image depending on choice of the kernel used to scan across the image. Accordingly, the use of such image processing algorithms further enhances the image.

Figure 6:
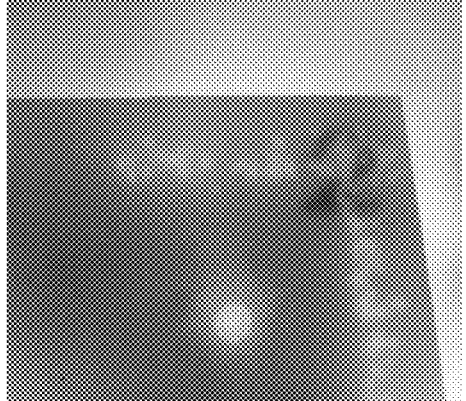
FIG. 6 is a series of images providing a comparison between images obtained from a conventional method against images obtained from the method of FIG. 3.
Figure 6:
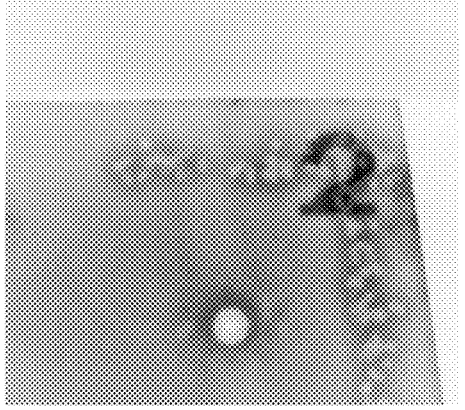
Figure 6:
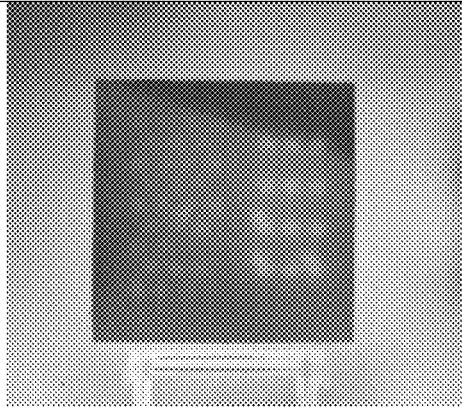
Figure 6:
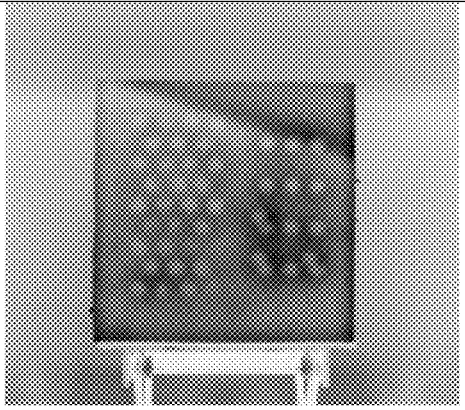
Figure 6:
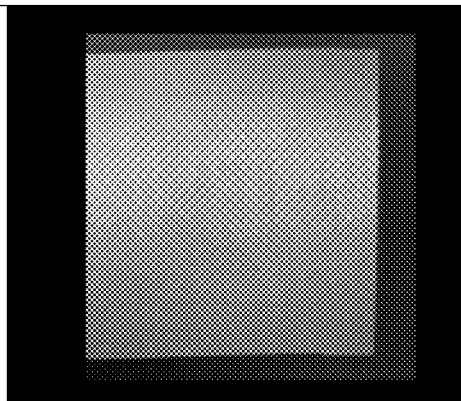
Figure 6:
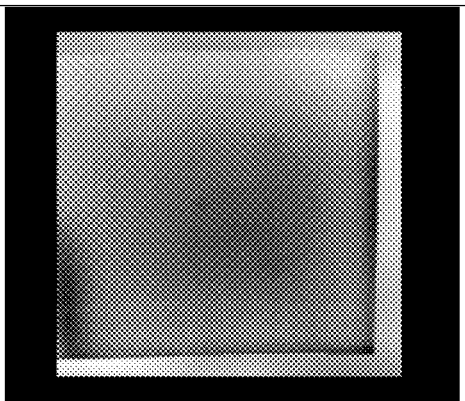

Referring now to FIG. 6, a comparison of results from a conventional method and the method 50 for generating a thermal image is shown. As can be seen from FIG. 6, thermal images obtained using the method 50 of FIG. 3 reveals much clearer details of subsurface conditions. Additionally, when the conventional method does not manage to detect subsurface abnormality in the third set of data, the thermal image obtained using the method 50 of FIG. 3 shows four (4) defects clearly, which are in line with the sample specification.

The heat map may be fused to a visual image of the subject 20 to present a fusion image where a thermal image overlays the corresponding visual image and both visual features and thermal features can be directly seen. This is advantageous because active IRT is used to inspect subsurface defects, and hence is not sufficient to pinpoint the exact location on the sample 20 if only thermal images are presented. Furthermore, some thermal anomalies may be due to surface features such as different colour or material/emissivity. Therefore, by placing a thermal image on top of a visual image, a user may rule out false alarms.

For thermal cameras with an embedded red-green-blue (RGB) camera, creation of a fusion image is straightforward. However, most thermal cameras are not equipped with an RGB camera and the visual image is normally separately taken. Hence, the two images usually come with different orientation and resolution.

Figure 7:
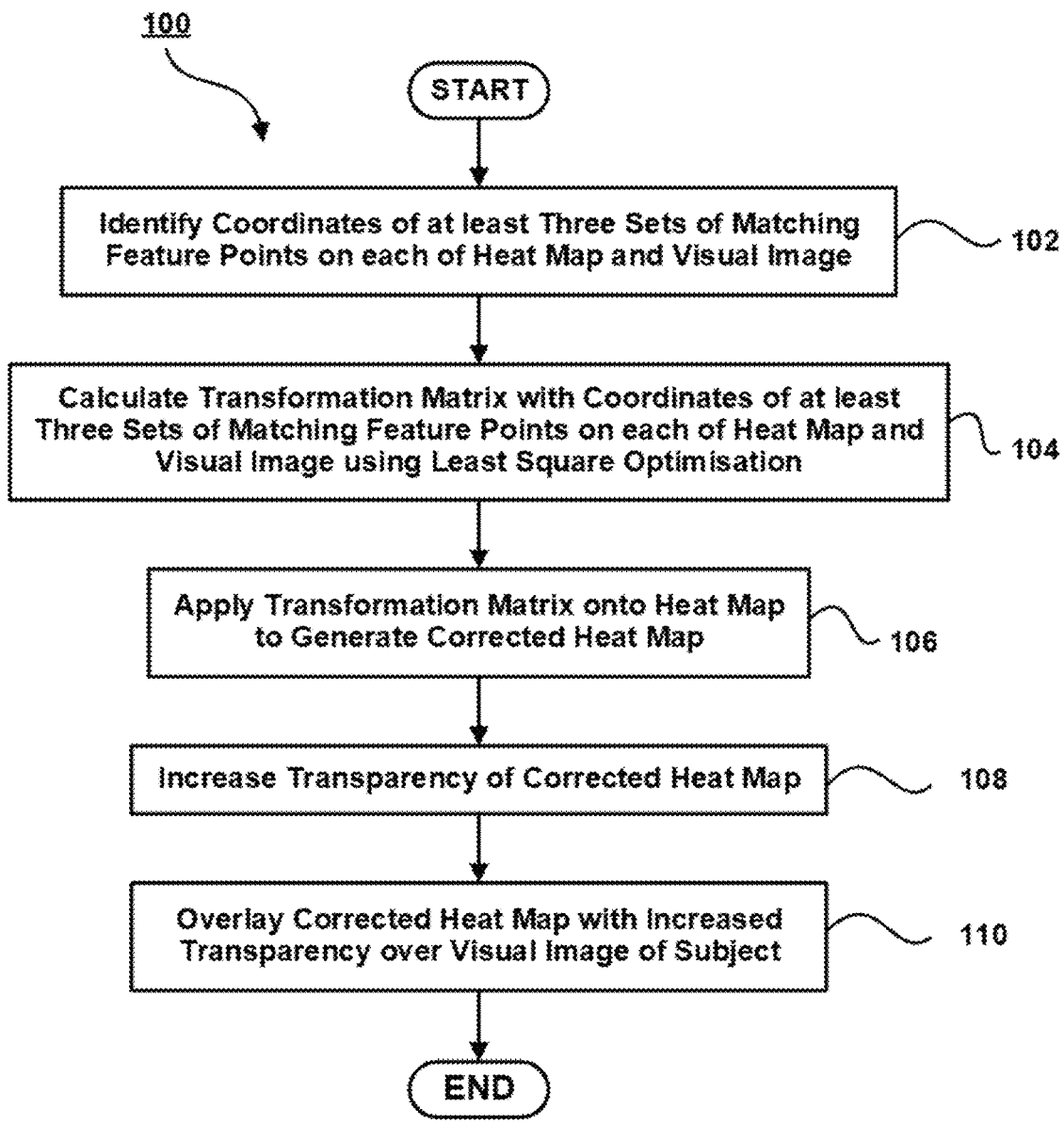
FIG. 7 is a schematic flow diagram illustrating a method of fusing a heat map to a visual image of a subject in accordance with an embodiment of the present invention.

Referring now to FIG. 7, an alignment method 100 to tackle this issue when the heat map is fused to a visual image of the subject 20 will now be described. The method 100 of fusing the heat map to the visual image of the subject 20 begins at step 102 by identifying coordinates of at least three sets of matching feature points on each of the heat map and the visual image. More particularly, after importing the thermal image and the visual image, a user needs to pick minimally three paired feature points from both images for alignment. It is therefore recommended to include some surface features when taking the images.

Figure 8C:
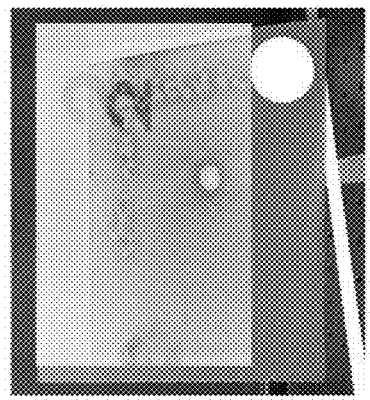
FIGS. 8A through 9C are examples of fusion images from fusing of visual images and thermal images.
Figure 8B:
Figure 8A:
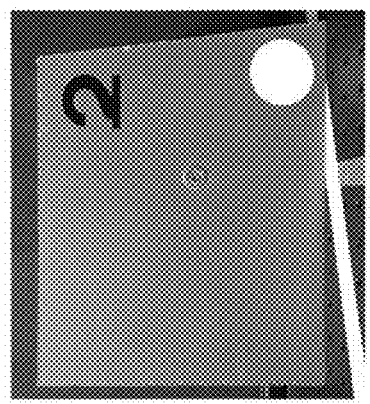
Figure 9C:
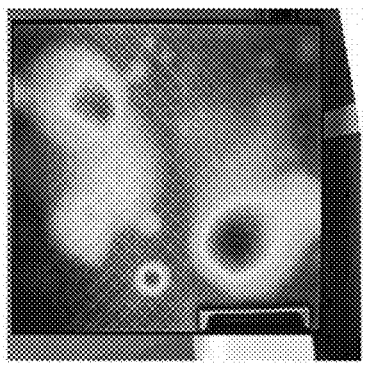
Figure 9B:
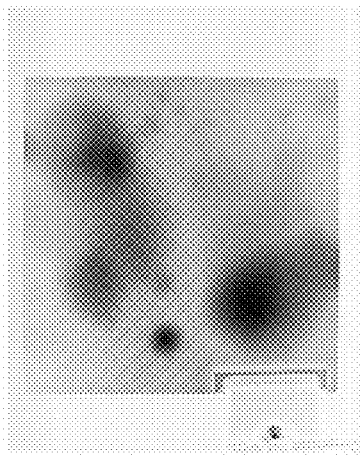
Figure 9A:
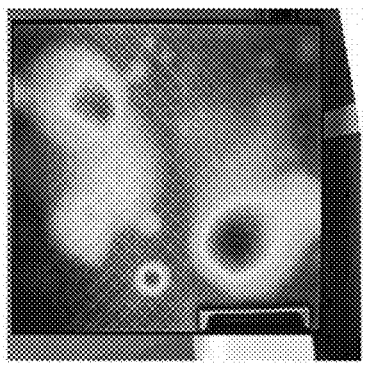

Referring now to FIGS. 8A and 9A, examples of visual images for fusion are shown. In FIG. 8A, a sticker and a screw are shown, both of which can be seen in both visual and thermal images, making them well suited as feature points. In FIG. 9A, where the surface is homogeneous with no extra marking, four (4) corners may be used as feature points. The coordinates of the feature points on the thermal image and their corresponding coordinates on the visual image may thus be extracted.

Referring again to FIG. 7, a transformation matrix is calculated with the coordinates of the at least three sets of matching feature points on each of the heat map and the visual image using least square optimisation at step 104.

At step 106, the transformation matrix is applied onto the heat map to generate a corrected heat map. More particularly, the transformation matrix is applied onto the thermal image to generate an orientation and resolution corrected new thermal image.

At step 108, a transparency of the corrected heat map is increased and at step 110, the corrected heat map with increased transparency is overlaid over the visual image of the subject. The new thermal image or corrected heat map may be added with a 50% transparency before being overlaid on top of the visual image.

Referring now to FIGS. 8A through 9C, examples of fusion images created from visual images of FIGS. 8A and 9A and heat maps or thermal images of FIGS. 8B and 9B are shown in FIGS. 8C and 9C.

Figure 10A:
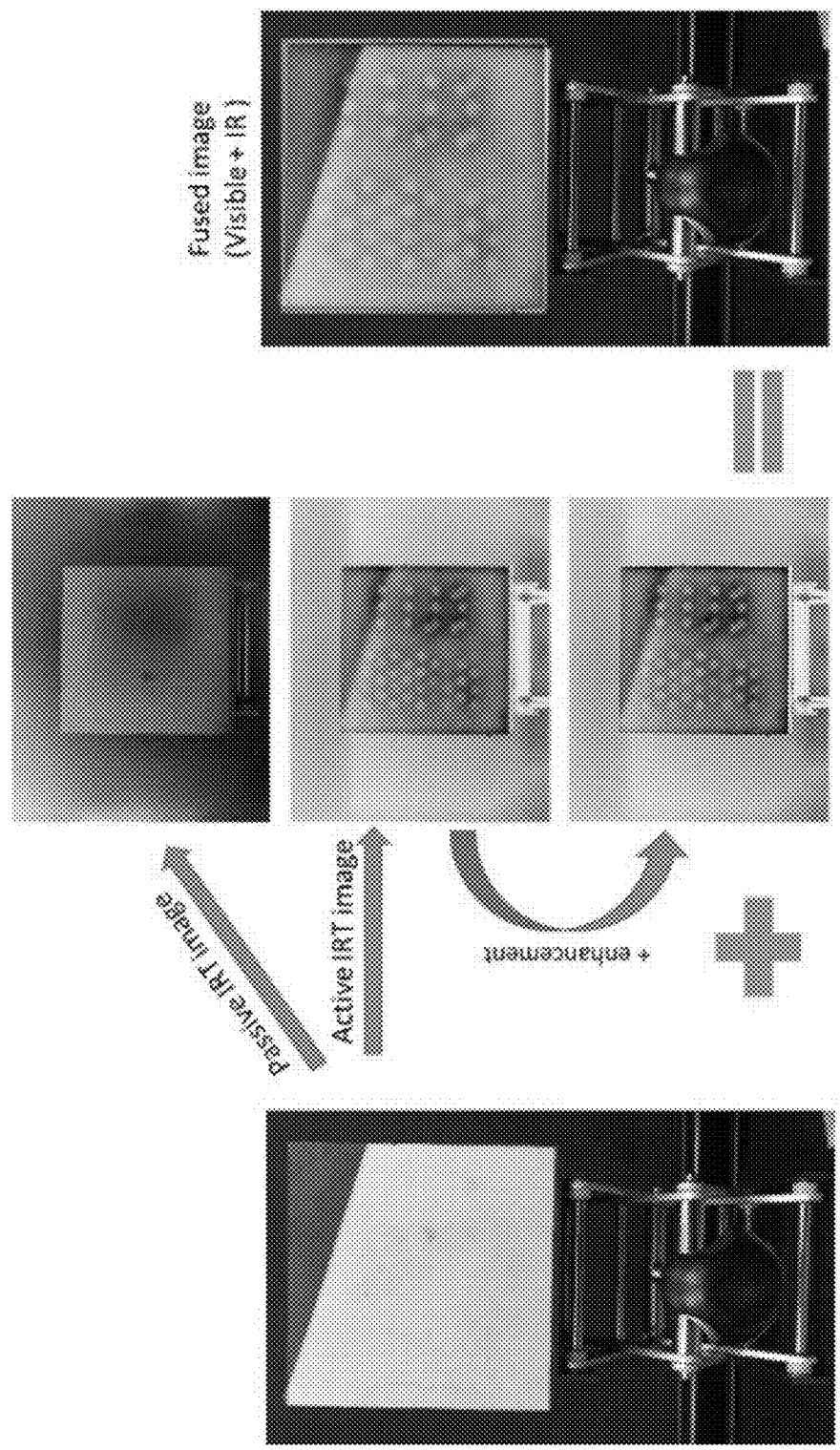
Figure 10B:
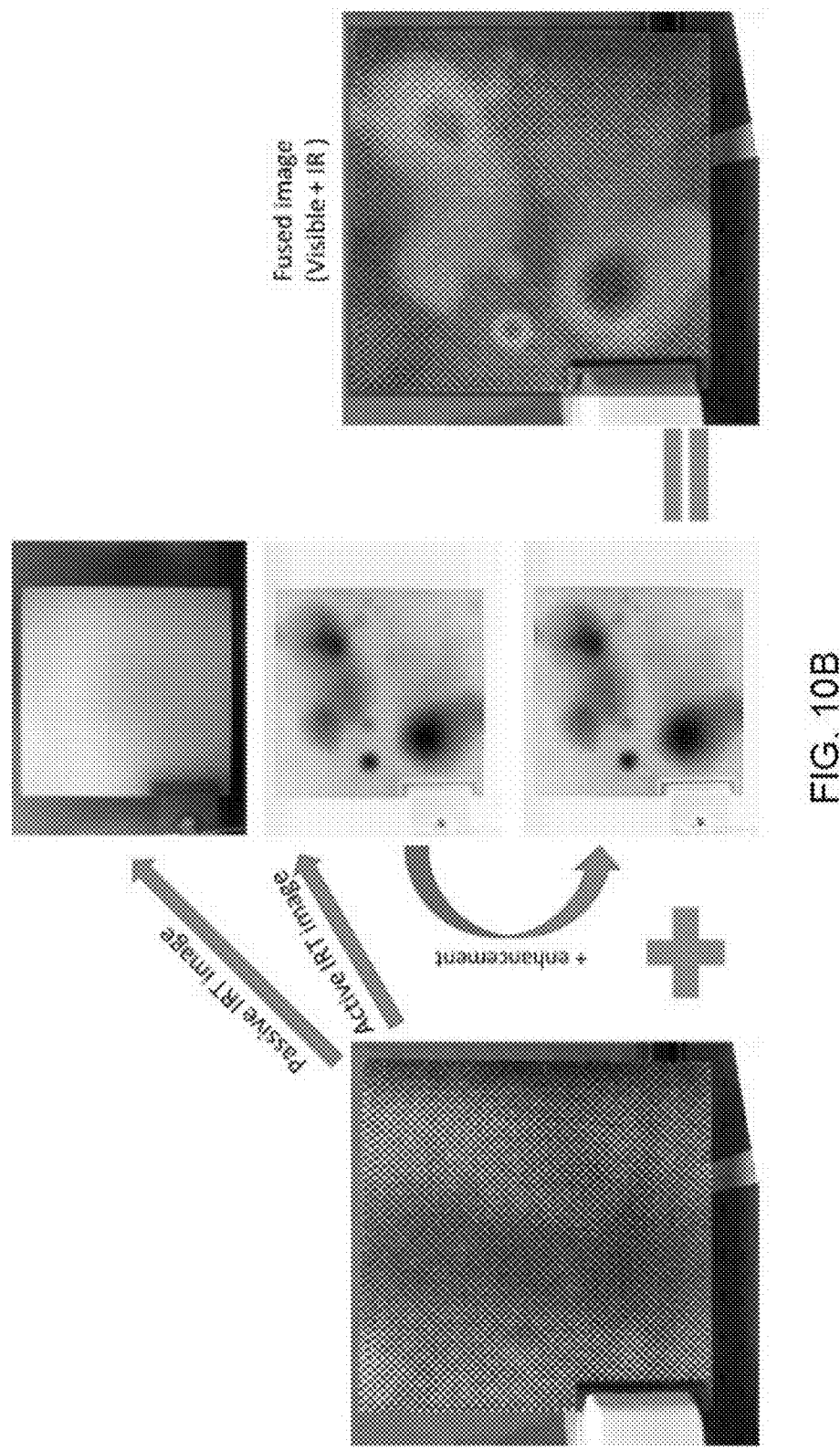
Figure 10D:
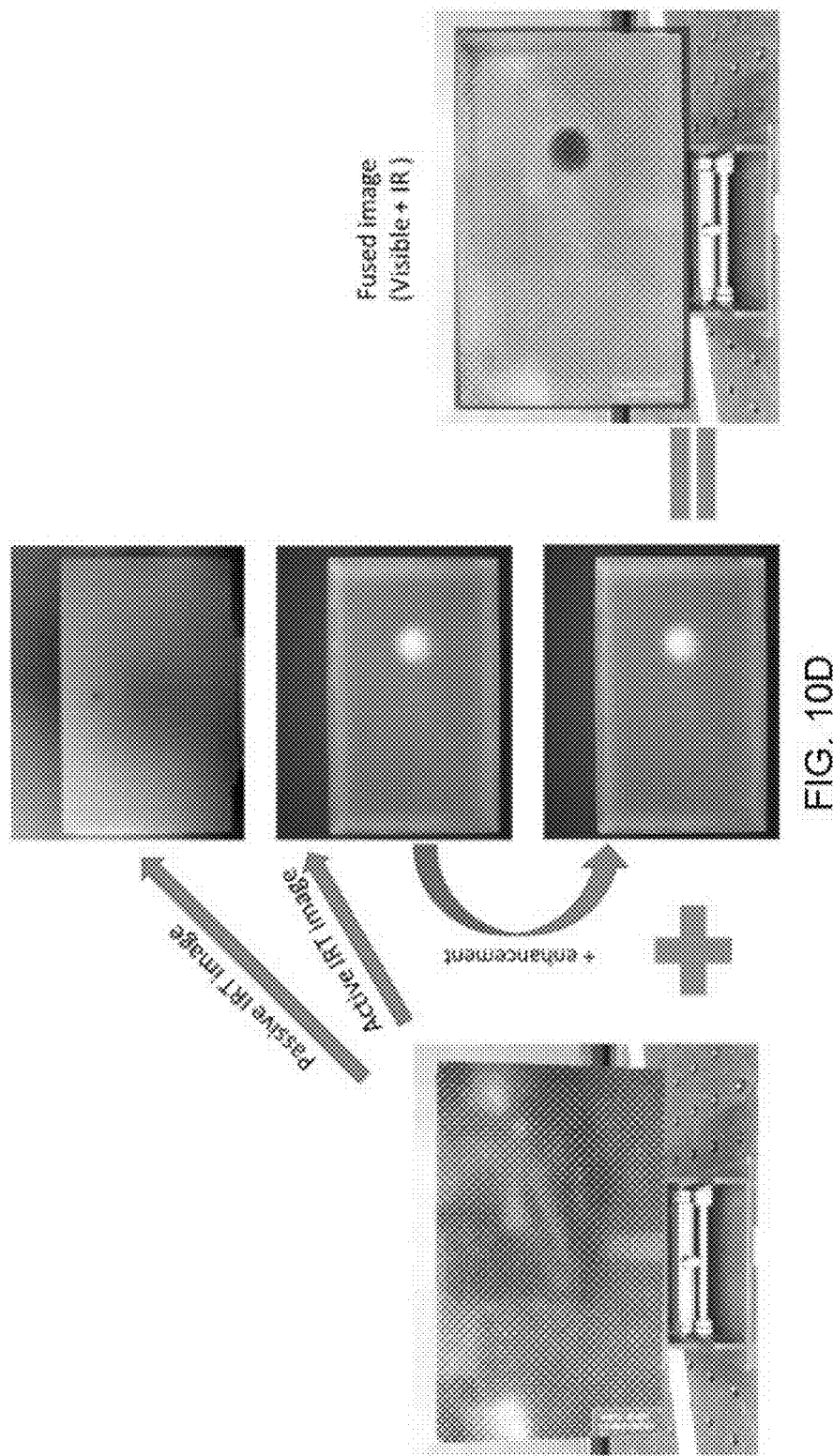
Figure 10E:
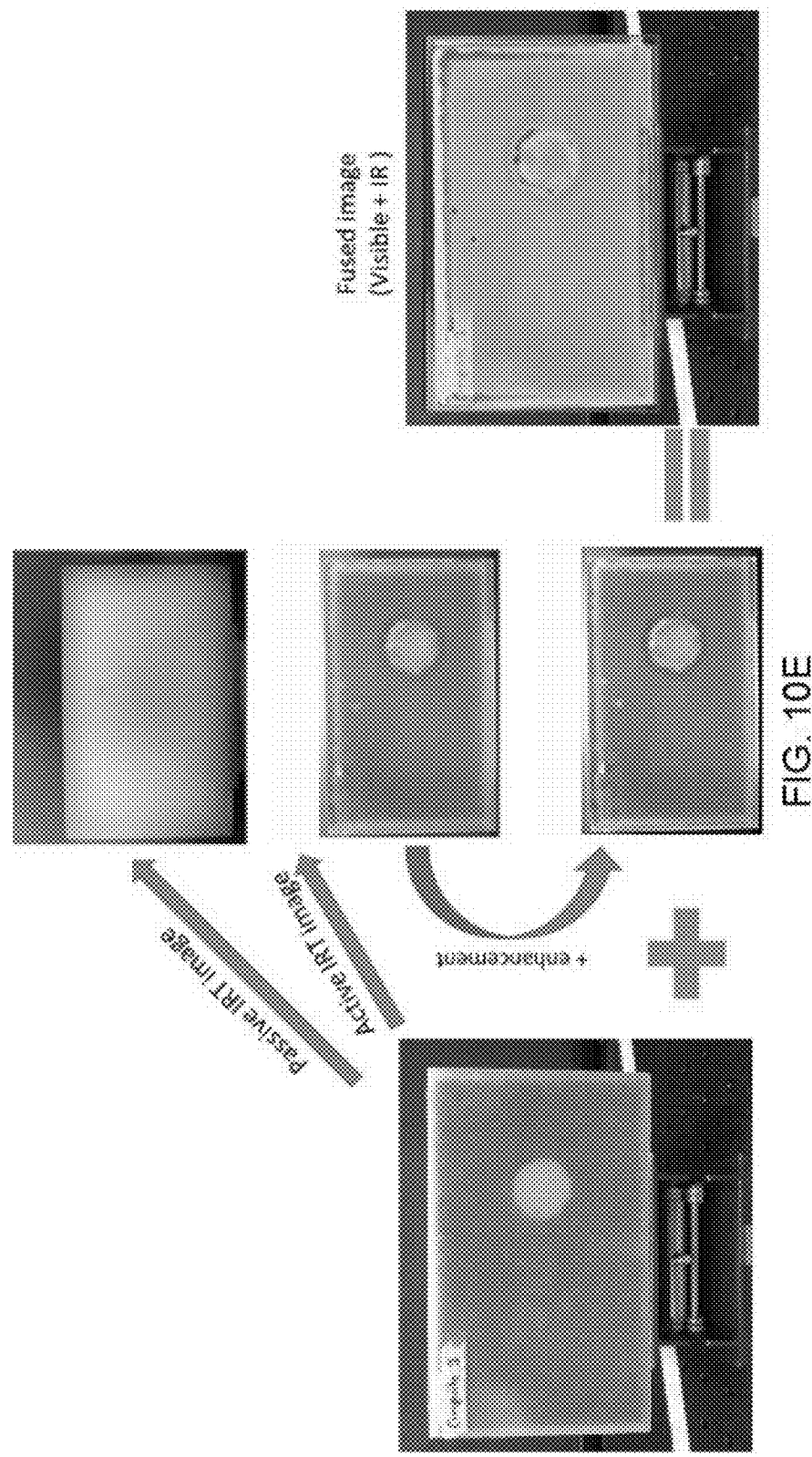

Referring now to FIGS. 10A through 10E, comparative examples of passive infrared thermography results and active infrared thermography results on different defects and composite materials are shown. More particularly, FIG. 10A shows infrared thermography results of a honeycomb composite with water ingress, FIG. 10B shows infrared thermography results of a carbon fibre reinforced polymer (CFRP) with heat damaged regions, FIG. 10C shows infrared thermography results of a carbon fibre reinforced polymer (CFRP) with inserts, FIG. 10D shows infrared thermography results of a carbon fibre reinforced polymer (CFRP) with a void, and FIG. 10E shows infrared thermography results of a glass fibre reinforced polymer (GFRP) with a void.

Figure 11A:
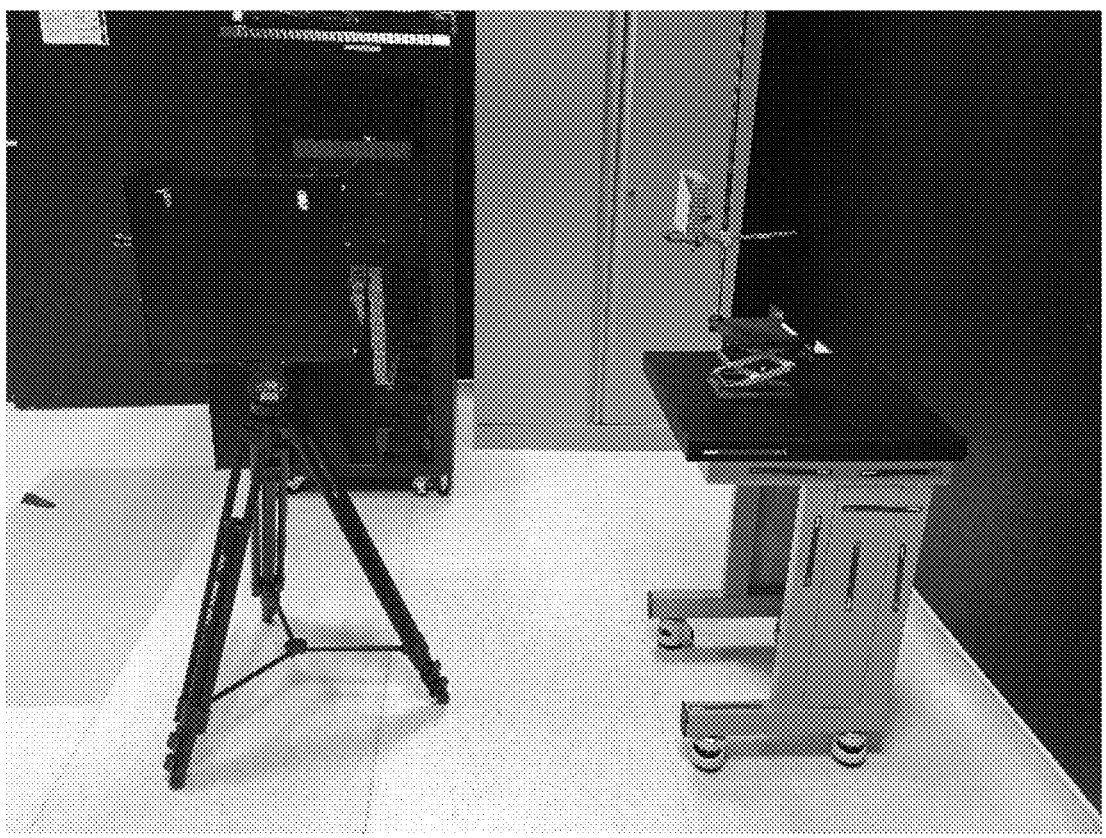
FIGS. 11A and 11B are photographs of different applications of the active IRT system in accordance with embodiments of the present invention.
Figure 11B:
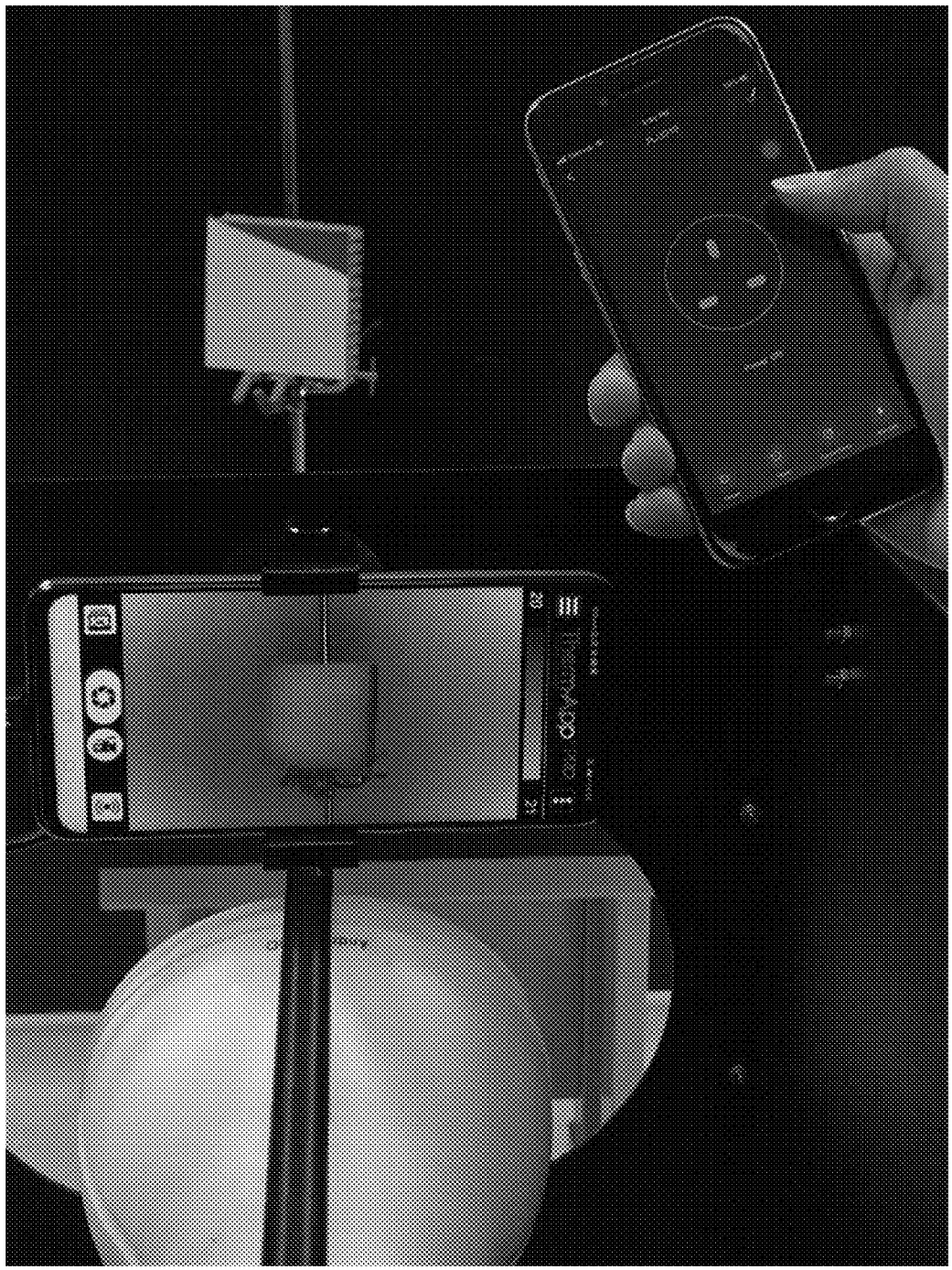

Referring now to FIGS. 11A and 11B, different applications of the active IRT system 12 are shown. More particularly, the setup shown in FIG. 11A may, for example, be used in active IR thermography inspection of an aircraft rudder and the setup shown in FIG. 2B may be mounted on a drone or other autonomous robot and remotely controlled.

As is evident from the foregoing discussion, the present invention provides an active infrared thermography system and a computer-implemented method for generating a thermal image that render inspection and defect detection more convenient and efficient. Advantageously, because the inventors have demonstrated that it is feasible to perform active IRT inspection using a low power source, the required excitation power may be satisfied with the use of a portable power supply/bank, instead of electrical cables that connect externally to a wall plug or high-power generator. The active IRT system of the present invention is thus truly portable, that is, "cable-free", and may be used on-site where there is no power supply. Apart from low power consumption requirements, the active IRT system of the present invention is also lightweight and wholly integrates all key components. Consequently, the active IRT system of the present invention may be mounted on a platform (e.g., drone, robotic arm) and/or carried around (e.g., tripod, backpack). The active IRT system of the present invention may also be remotely controlled and monitored and is therefore able to excuse an inspector/operator from dangerous/hazardous/inaccessible areas. Further advantageously, the active IRT inspection system of the present invention is highly customizable as the visible and IR cameras may have different specifications to cater to different application needs. The active IRT inspection system and method of the present invention may also enhance thermal images, fuse and display both visual and thermal images together on a mobile device (e.g. laptop) within seconds (<30 s). The active IRT system and method of the present invention may be applied for aircraft inspection, internal and/or external building inspection, and railway, pipeline, Deep Tunnel Sewerage System (DTSS) inspection by one inspector, a crawling robot or drone, etc.

While preferred embodiments of the invention have been described, it will be clear that the invention is not limited to the described embodiments only. Numerous modifications, changes, variations, substitutions and equivalents will be apparent to those skilled in the art without departing from the scope of the invention as described in the claims.

Further, unless the context clearly requires otherwise, throughout the description and the claims, the words "comprise", "comprising" and the like are to be construed in an inclusive as opposed to an exclusive or exhaustive sense; that is to say, in the sense of "including, but not limited to".

The invention claimed is:

1. An active infrared thermography system, comprising:
one or more excitation sources;
an infrared camera;
one or more portable power sources arranged to power the one or more excitation sources and the infrared camera;
a housing, wherein the one or more excitation sources and the one or more portable power sources are received in the housing;
a non-transitory computer-readable memory storing computer program instructions executable by one or more computer processors to perform operations for generating a thermal image, the operations comprising:
acquiring thermal image data on a subject;
activating one or more excitation sources to radiate the subject;
ending acquisition of the thermal image data on the subject when a cooling pattern is captured;
determining a cooling curve of each pixel of the thermal image data;
calculating a cooling coefficient of each pixel of the thermal image data; and
scaling the cooling coefficient of each pixel of the thermal image data to a colour palette to produce a heat map; and
fusing the heat map to a visual image of the subject;
wherein the operation of fusing the heat map to the visual image of the subject comprises:
identifying coordinates of at least three sets of matching feature points on each of the heat map and the visual image;
calculating a transformation matrix with the coordinates of the at least three sets of matching feature points on each of the heat map and the visual image using least square optimisation; and
applying the transformation matrix onto the heat map to generate a corrected heat map.

2. The active infrared thermography system according to claim 1, wherein each of the one or more excitation sources has a radiative power of less than 500 watts (W).

3. The active infrared thermography system according to claim 2, wherein the radiative power of each of the one or more excitation sources is between about 100 W and about 450 W.

4. The active infrared thermography system according to claim 1, wherein each of the one or more excitation sources has a mass of less than 400 grams (g).

5. The active infrared thermography system according to claim 4, wherein the mass of each of the one or more excitation sources is between about 200 g and about 300 g.

6. The active infrared thermography system according to claim 1, further comprising one or more shutters arranged to at least partially block off the one or more excitation sources.

7. The active infrared thermography system according to claim 1, further comprising a visible camera powered by the one or more portable power sources and received in the housing.

8. The active infrared thermography system according to claim 1, wherein the active infrared thermography system has a mass of between about 0.5 kilogram (kg) and 5 kg.

9. The active infrared thermography system according to claim 8, wherein the mass of the active infrared thermography system is between about 1 kg and about 2 kg.

10. The active infrared thermography system according to claim 1, wherein the one or more excitation sources are to be activated after a predetermined delay.

11. The active infrared thermography system according to claim 10, wherein the operations further comprise:
performing background subtraction using the thermal image data acquired during the predetermined delay.

12. The active infrared thermography system according to claim 1, wherein the thermal image data is to be acquired in video form.

13. The active infrared thermography system according to claim 12, wherein the operations further comprise:
converting the thermal image data in the video form into a three-dimensional (3D) array.

14. The active infrared thermography system according to claim 1, wherein the operation of determining the cooling curve of each pixel of the thermal image data comprises:
extracting a temporal temperature profile of each pixel of the thermal image data.

15. The active infrared thermography system according to claim 14, wherein the operation of determining the cooling curve of each pixel of the thermal image data further comprises:

offsetting a starting time of the temporal temperature profile of each pixel of the thermal image data to a start of a cooling down process.

16. The active infrared thermography system according to claim 1, wherein the operation of calculating the cooling coefficient of each pixel of the thermal image data comprises:

fitting the cooling curve of each pixel of the thermal image data to Newton's cooling model.

17. The active infrared thermography system according to claim 1, wherein the operations further comprise:

applying at least one of a Gaussian sharpening filter and a convolution filter to the heat map.

18. The active infrared thermography system according to claim 1, wherein the operation of fusing the heat map to the visual image of the subject further comprises:

increasing a transparency of the corrected heat map; and
overlaying the corrected heat map with increased transparency over the visual image of the subject.

19. A computer-implemented method for generating a thermal image, comprising executing on one or more processors the steps of:

acquiring thermal image data on a subject;
activating one or more excitation sources to radiate the subject;
ending acquisition of the thermal image data on the subject when a cooling pattern is captured;
determining a cooling curve of each pixel of the thermal image data;
calculating a cooling coefficient of each pixel of the thermal image data;
scaling the cooling coefficient of each pixel of the thermal image data to a colour palette to produce a heat map;
fusing the heat map to a visual image of the subject;
wherein the step of fusing the heat map to the visual image of the subject comprises:
identifying coordinates of at least three sets of matching feature points on each of the heat map and the visual image;
calculating a transformation matrix with the coordinates of the at least three sets of matching feature points on each of the heat map and the visual image using least square optimisation; and
applying the transformation matrix onto the heat map to generate a corrected heat map.

20. The computer-implemented method for generating a thermal image according to claim 19, wherein the one or more excitation sources are activated after a predetermined delay.

21. The computer-implemented method for generating a thermal image according to claim 20, further comprising:

performing background subtraction using the thermal image data acquired during the predetermined delay.

22. The computer-implemented method for generating a thermal image according to claim 19, wherein the thermal image data is acquired in video form.

23. The computer-implemented method for generating a thermal image according to claim 22, further comprising:

converting the thermal image data in the video form into a three-dimensional (3D) array.

24. The computer-implemented method for generating a thermal image according to claim 19, wherein the step of determining the cooling curve of each pixel of the thermal image data comprises:

extracting a temporal temperature profile of each pixel of the thermal image data.

25. The computer-implemented method for generating a thermal image according to claim 24, wherein the step of determining the cooling curve of each pixel of the thermal image data further comprises:

offsetting a starting time of the temporal temperature profile of each pixel of the thermal image data to a start of a cooling down process.

26. The computer-implemented method for generating a thermal image according to claim 19, wherein the step of calculating the cooling coefficient of each pixel of the thermal image data comprises:

fitting the cooling curve of each pixel of the thermal image data to Newton's cooling model.

27. The computer-implemented method for generating a thermal image according to claim 19, further comprising:

applying at least one of a Gaussian sharpening filter and a convolution filter to the heat map.

28. The computer-implemented method for generating a thermal image according to claim 19, wherein the step of fusing the heat map to the visual image of the subject further comprises:

increasing a transparency of the corrected heat map; and
overlaying the corrected heat map with increased transparency over the visual image of the subject.

* * * * *